(12) United States Patent
DeRosa (10) Patent No.: US 6,597,529 B1
(45) Date of Patent: Jul. 22, 2003

(54) METHOD AND APPARATUS FOR REDUCING ACOUSTIC NOISE IN SERVO-CONTROLLED SYSTEM

(75) Inventor: Jeffrey V. DeRosa, Burlington, MA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/439,775

(22) Filed: Nov. 12, 1999

(51) Int. Cl.[7] .................................................. G11B 5/55
(52) U.S. Cl. .................................. 360/78.14; 360/78.04
(58) Field of Search ................................. 360/78.14, 75, 360/78.04, 78.06, 78.07; 318/561

(56) References Cited

U.S. PATENT DOCUMENTS

| | | | | |
|---|---|---|---|---|
| 4,547,822 A | * | 10/1985 | Brown | 360/78.06 |
| 4,775,903 A | * | 10/1988 | Knowles | 360/78.07 |
| 4,796,112 A | * | 1/1989 | Mizukami et al. | 360/78.07 |
| 4,937,689 A | * | 6/1990 | Seaver et al. | 360/78.07 |
| 4,956,831 A | | 9/1990 | Sarraf et al. | |
| 4,965,501 A | * | 10/1990 | Hashimoto | 360/78.07 X |
| 5,005,089 A | | 4/1991 | Thanos et al. | |
| 5,184,339 A | * | 2/1993 | Tsuchiya | 360/78.07 X |
| 5,255,249 A | * | 10/1993 | Horigome | 360/78.04 X |
| 5,291,110 A | | 3/1994 | Andrews et al. | 360/78.06 X |
| 5,465,034 A | | 11/1995 | Andrews et al. | 360/78.06 X |
| 5,465,035 A | | 11/1995 | Scaramuzzo et al. | 360/78.07 X |
| 5,657,179 A | | 8/1997 | McKenzie | |
| 5,668,680 A | | 9/1997 | Tremaine | |
| 5,677,609 A | * | 10/1997 | Khan et al. | 360/75 X |
| 5,696,647 A | | 12/1997 | Phan et al. | |
| 5,726,825 A | | 3/1998 | Phan et al. | |
| 5,751,513 A | | 5/1998 | Phan et al. | |
| 5,760,992 A | | 6/1998 | Phan et al. | |
| 6,140,240 A | | 10/2000 | Wang et al. | |
| 6,256,163 B1 | | 7/2001 | Schmidt | |

\* cited by examiner

*Primary Examiner*—David Hudspeth
*Assistant Examiner*—James L Habermehl (57) ABSTRACT

A method is provided for radially moving a transducer over a storage surface of a rotating data disk including multiple concentric data tracks, for reducing noise generated during a seek operation from a starting track to a destination track on the disk. The transducer is radially moveable relative to said data tracks by an actuator in proportion to an input signal to the actuator, wherein the transducer is initially accelerated away from the starting track to a radial transition location between the starting track and the destination track, and then decelerated toward the destination track from the transition location. The method comprises the steps of: (a) detecting a radial location of the transducer in relation to the disk; (b) detecting the distance between the transducer and the transition location; (c) estimating a time-related interval for the transducer to traverse the detected distance; and (d) regulating the input signal as a function of the estimated interval to control the rate of change of radial velocity of the transducer across the disk.

34 Claims, 5 Drawing Sheets

METHOD AND APPARATUS FOR REDUCING ACOUSTIC NOISE IN SERVO-CONTROLLED SYSTEM

FIELD OF THE INVENTION

The invention relates generally to servo-controlled systems, and more particularly to reducing acoustic noise in magnetic disk data storage devices.

BACKGROUND OF THE INVENTION

Computer systems generally include a central processor unit and a random access memory which are coupled together via a system bus. In order to store large quantities of data for use by the computer system typically a magnetic disk storage device is utilized. Magnetic disk storage devices generally include a plurality of disks which rotate at a preselected speed, and an actuator for moving a head carrier that supports transducers (read/write heads) across the rotating disks to write data to or read data from concentric data tracks on the disks. The actuator moves the transducer in a radial direction across the rotating disks in response to an input signal which controls supply of an electrical current to a motor in the actuator that governs the movement of the actuator for exerting a force to the transducer.

To access data on disk tracks, in a seek operation the transducer is moved radially across the tracks from a starting track to a destination track where the data resides. Thereafter, the rotation of the disk rotates the data on the destination track under the transducer for writing data to or reading data therefrom. The amount of time required for accessing the data, or access time, includes the time spent for the seek operation in positioning a transducer over a destination track, settling time, and a rotational latency which is the time for the data on the destination track to rotate under the transducer.

As computer processor speeds increase, there is a concomitant need to decrease access times to information stored on mass storage devices such as hard disk drives. In order to access information quickly, it is desirable for the transducer of a disk drive to be able to change its position rapidly during a seek operation. As such, in conventional disk drives, the transducer is moved between data tracks by supplying electrical currents to the actuator to initially accelerate the transducer from the starting track and then decelerate the transducer to the destination track.

However, the transition from acceleration to deceleration in conventional disk drives is generally defined by a sudden change in the polarity of the actuator current from full power in one direction (e.g. positive) to full power in an opposite direction (e.g. negative). This rapid change in current exerts rapidly changing forces on the actuator, causing vibration of the actuator and the disk drive, and resulting in acoustical noise. The acoustical noise is highly undesirable, specially in the office environment where an increasing number of disk drives are utilized. Further, the vibration of the actuator further increases the settling time.

To reduce the vibrations and acoustical noise, in some conventional disk drives a predetermined transducer radial velocity profile is stored in memory, wherein the velocity profile defines programmed actuator current levels for the seek operation. As such, the transducer is moved across the disk without radial position or velocity feedback to control the movement of the transducer.

However, using a velocity profile to control actuator currents does not take real-time transducer motion information into consideration for controlling the actuator current for minimizing vibration and acoustical noise. There is, therefore, a need for method and apparatus for reducing vibration acoustical noise induced during seek operations in disk drives, wherein the transducer motion information is utilized to control movement of the transducer.

BRIEF SUMMARY OF THE INVENTION

The present invention satisfies these needs. In one embodiment, the present invention provides a method for radially moving a transducer over a storage surface of a rotating data disk including multiple concentric data tracks, for reducing noise generated during a seek operation from a starting track to a destination track on the disk. The transducer is radially moveable relative to the data tracks by an actuator in proportion to an input signal to the actuator, wherein the transducer is initially accelerated away from the starting track to a radial transition location between the starting track and the destination track, and then decelerated toward the destination track from the transition location. The method comprises the steps of: (a) detecting a radial location of the transducer in relation to the disk tracks; (b) detecting the distance between the detected transducer location and the transition location; (c) estimating a time interval for the transducer to traverse the detected distance; and (d) regulating the input signal as a function of the estimated time interval to control the rate of change of radial velocity of the transducer across the disk.

Steps (a) through (d) are performed repetitively. Step (d) can further include the steps of regulating the input signal to control variation in the rate of change of the radial velocity of the transducer. Further, the step of regulating the input signal can include the steps of limiting the magnitude of the input signal as a function of the estimated interval. Step (c) can further include the steps of: detecting the radial velocity of the transducer across the disk at the detected transducer location; detecting the rate of change of the radial velocity of the transducer at the detected transducer location; and estimating the time interval as a function of: (1) the detected distance, (2) the detected radial velocity, and (3) the detected rate of change of the radial velocity.

Preferably, the concentric data tracks are perodically interrupted by a plurality of embedded radial servo sectors per rotation, wherein each servo sector recorded with head position information and defining a sampling interval. In that case, step (a) further includes the steps of detecting the radial location of the transducer by detecting the is head position information in a servo sector passing under the transducer; and step (d) further includes the steps of: (1) estimating a number of sampling intervals in the estimated interval; (2) comparing the estimated number of sampling intervals to a preselected number; and (3) if the estimated number of sampling intervals is less than the preselected number, then regulating the input signal as a function of the estimated number of sampling intervals to control the rate of change of radial velocity of the transducer across the disk. Step (d)(3) can further include the steps of: if the estimated number of sampling intervals is greater than or equal to the preselected number, then regulating the input signal to maintain the rate of change in radial velocity of the transducer at a predetermined level.

During the acceleration of the transducer, step (b) further includes the steps of detecting the forward distance between the transducer location and the transition location as said detected distance; and step (d) further includes the steps of regulating the input signal to decrease the acceleration of the transducer toward the transition location to achieve zero transducer acceleration over the transition location. Similarly, during said deceleration of the transducer, step (b) further includes the steps of detecting the backward distance between the transducer location and the transition location as said detected distance; and step (d) further includes the steps of regulating the input signal to increase the deceleration of the transducer from the transition location.

In another aspect the present invention provides a servo controller implementing the above steps for controlling seek operations in said disk drive. In one embodiment, the servo controller comprises: a location detector for detecting successive radial locations of the transducer relative to the disk tracks in response to successive clocking signals during the seek operation; and a programmed digital controller connected to said location detector, wherein the programmed digital controller is configured by program instructions for performing the following steps for each detected transducer radial location: (a) determining the distance between the detected transducer location and the transition location; (b) determining the radial velocity of the transducer across the disk at the detected transducer location; (c) determining the rate of change of the radial velocity of the transducer across the disk at the detected transducer; and (d) generating a control signal for regulating the input signal as a function of: (1) the detected distance, (2) the detected radial velocity, and (3) the detected rate of change of the radial velocity, to control the rate of change of the radial velocity of the transducer.

The data disk can include the concentric data tracks described above, wherein the location detector detects the radial location of the transducer by detecting the head position information in a servo sector passing under the transducer; and the programmed digital controller is further configured by program instructions to perform the steps of: estimating a number of sampling intervals passing the transducer over the detected distance, as a function of each detected distance, radial velocity, and rate of change of radial velocity; comparing the estimated number of sampling intervals to a preselected number; and if the estimated number of sampling intervals is less than the preselected number, then generating the control signal to regulate the input signal as a function of the estimated number of sampling intervals to control the rate of change of radial velocity of the transducer across the disk. And, the programmed digital controller can be further configured by program instructions to perform the steps of: if the estimated number of sampling intervals is greater than or equal to the preselected number, then generating the control signal to regulate the input signal to maintain the rate of change in radial velocity of the transducer at a predetermined level.

In one version, the programmed digital controller generates the control signal to regulate the input signal by limiting the magnitude of the input signal as a function of: the detected distance, (2) the detected radial velocity, and (3) the detected rate of change of the radial velocity, to control the rate of change of the radial velocity of the transducer. During the acceleration of the transducer the programmed digital controller detects the forward distance between the detected transducer radial location and the transition location as said detected distance, and generates the control signal to regulate the input signal to decrease the acceleration of the transducer toward the transition location to achieve zero transducer acceleration over the transition location. And, during the deceleration of the transducer the programmed digital controller detects the backward distance between the detected transducer radial location and the transition location as said detected distance, and generates the control signal to regulate the input signal to increase the deceleration of the transducer from the transition location.

As such, according to one embodiment of the present invention, by generating a control signal to decrease said actuator input signal for decreasing the transducer acceleration in the vicinity of the transition location to achieve zero velocity as the transducer passes over the transition location, and then by increasing said input signal in the vicinity of the transition location for increasing transducer deceleration from the transition location, rapidly changing forces to the actuator during transition from acceleration to deceleration are reduced, resulting in reduced acoustic noise and vibration.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
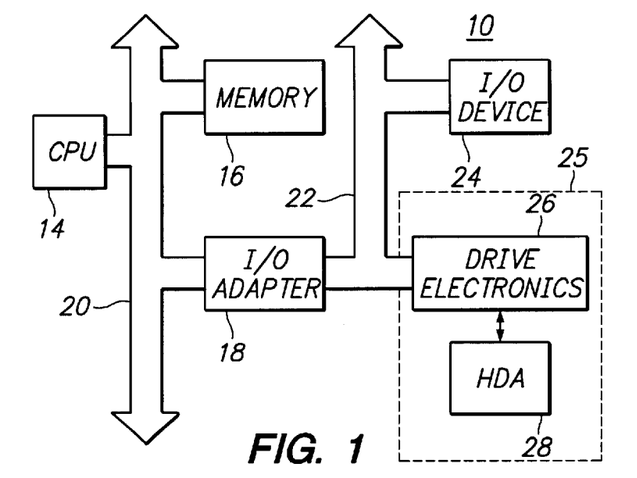
FIG. 1 is a block diagram of an embodiment of a computer system including a disk storage system according to the present invention.

Referring to FIG. 1, an example computer system 10 is shown to include a central processing unit ("CPU") 14, a main memory 16, and I/O bus adapter 18, all interconnected by a system bus 20. Coupled to the I/O bus adapter 18 is I/O bus 22, that can be e.g. a small computer system interconnect (SCSI) bus, and which supports various peripheral devices 24 including a disk storage unit such as a disk drive 25. The disk drive 25 includes drive electronics 26 and a head disk assembly 28 ("HDA").

Figure 2:
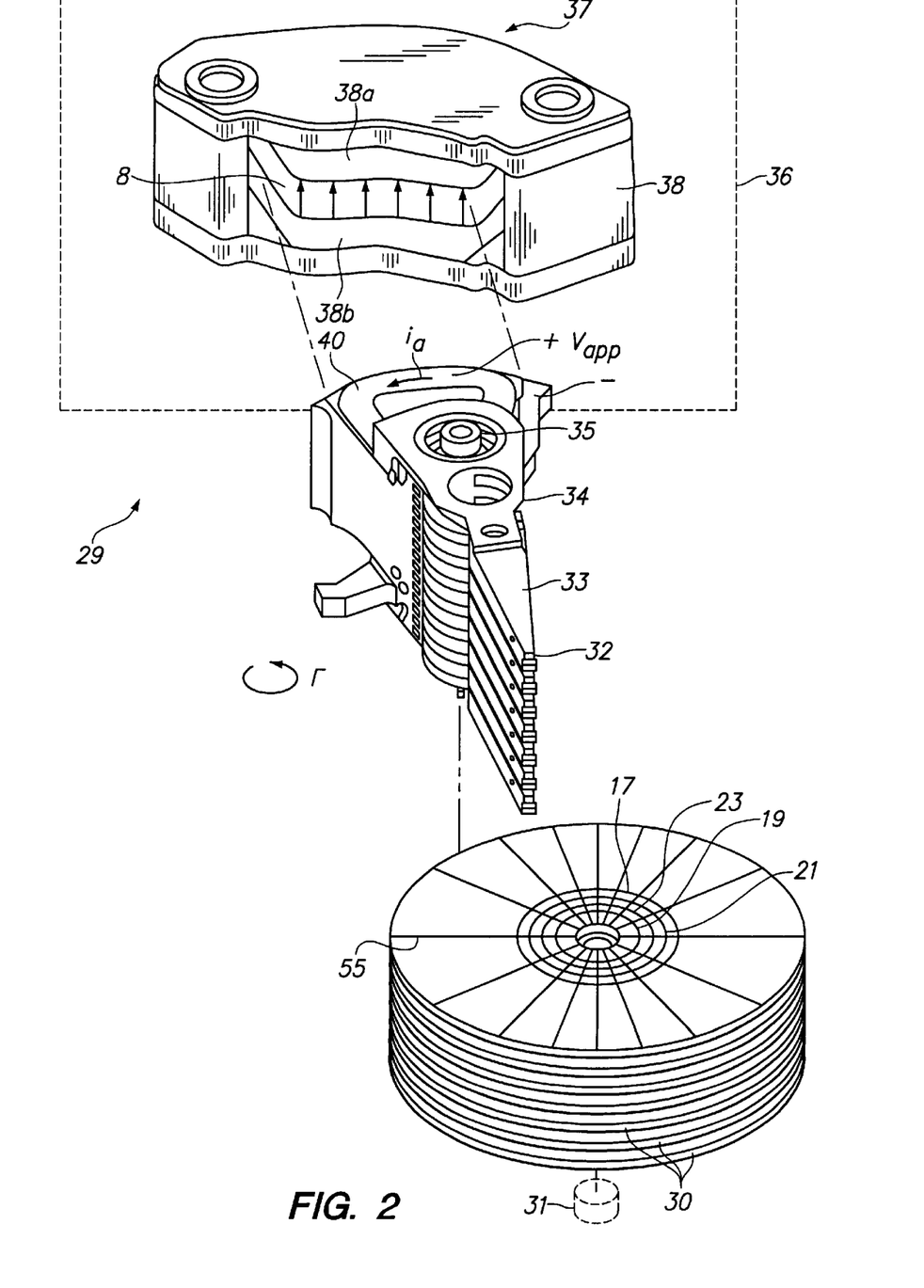
FIG. 2 is a mechanical assembly drawing of an embodiment of the head disk assembly of FIG. 1.

Referring to FIG. 2, in one embodiment the HDA 28 of FIG. 1 is shown to further include an actuator 29, and disks 30 rotated by a spindle motor 31, on which disk 30 data are stored. Data are stored on the disks 30 in concentric circular data tracks 17. Data are written and read from the disks 30 in a conventional manner via magnetic transducers 32 which are attached to flexible load beams 33 extending from actuator arms 34. The actuator arms 34 pivot about point 35 to move the load beams 33 in a radial direction over the storage surfaces of the disks 30 from a starting track 19 towards a destination track 21 shown in FIG. 2 by example. At the destination track 19, the magnetic transducers 32 can read from or write data on the disks 30. A motor 36 controls the radial movement of the actuator arms 34 in proportion to an input signal.

The motor 36 is shown to include a magnet 37 containing two plates 38a, 38b coupled together via a pair of sidewalls to form a flat toroidal shaped member 38. A wire coil 40 is disposed between the two plates 38a and 38b. The magnet 37 generates a constant magnetic field B between the plates 38a and 38b. When an input current signal $I_a$ is induced in the coil 40 disposed in the magnetic field B, a torque is produced on the actuator arms 34 resulting in radial motion of the arms 34 about pivot point 35. The polarity of the input current $I_a$ determines the direction of radial motion of the actuator arms 34.

Figure 3:
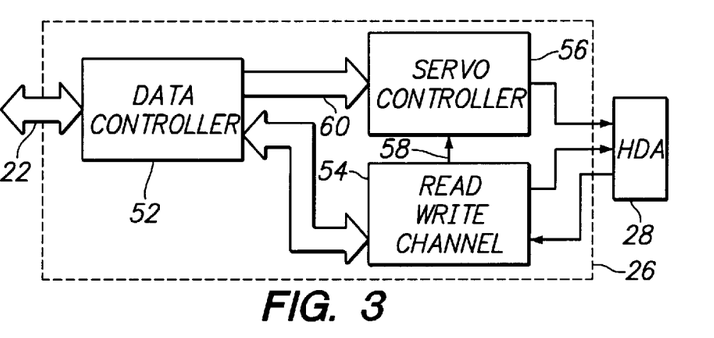
FIG. 3 is a block diagram of an embodiment of the drive electronics of FIG. 1 including a servo controller according to the present invention.

Referring to FIG. 3, in one embodiment the drive electronics 26 of FIG. 1 is shown to include a data controller 52, a read/write channel 54, and a servo controller 56. A typical data transfer initiated by the CPU 14 to the disk drive 25 may involve for example a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54.

The read/write channel 54 operates in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58 in a conventional manner. Specifically, the concentric data tracks 17 on the storage surface of a data disk 30 are broken up and divided into segments by a multiplicity of regularly spaced apart embedded servo sectors 55 (FIG. 2). Each servo sector 55 includes head positioning information such as a track identification field for identifying the track address that includes the servo sector 55, and burst fields to provide servo fine position information, all for detecting the location of a transducer 32 in relation to that track. The head positioning information is induced into the transducer 32, converted from analog signals to digital data in the read/write channel 54, and transferred to the servo controller 56, wherein the servo controller 56 utilizes the head positioning information for performing seek and tracking operations of the transducer 32 over the disk tracks 17.

The data controller 52 also provides destination track position data on lines 60 to the servo controller 56. The destination track position data on lines 60 provides course positioning information to the servo controller 56 for specifying a seek length, wherein the seek length is the radial distance that the actuator arm 34 must move the transducer 32 to reach the destination track to which the CPU 14 has requested access. The time period for the transducer to cross over the tracks between the starting track and the destination track in the seek length is the seek time. The servo controller 56 uses the seek length data on lines 60 and the servo head positioning information on lines 58 to generate in response, a current value $I_{COMMAND}$ to control supply of the input actuator current $I_a$ to the motor 36, resulting in controlled movement of the actuator arm 34, and therefore the transducer 32 as described below.

Figure 4:
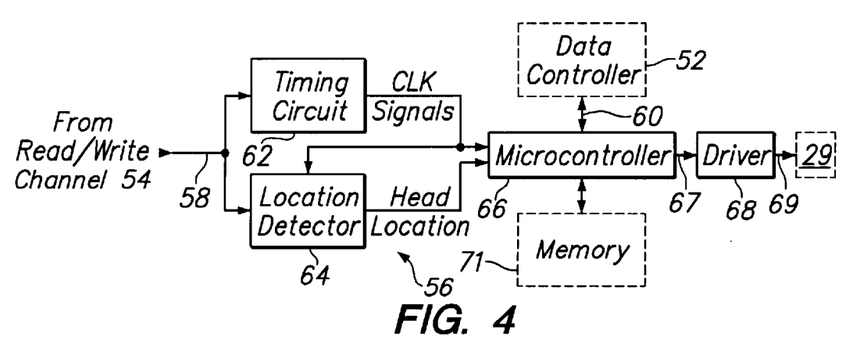
FIG. 4 is a block diagram of an embodiment of the servo controller of FIG. 3.

Referring to FIG. 4, in one embodiment the servo controller 56 includes a timing is circuit 62 to generate clock signals synchronized with the passage of servo sectors 55 on tracks under the transducer 32. The timing circuit 62 can include a counter and a phase locked loop (not shown) for generating the clock signals. In response to the clock signals from the timing circuit 62, a location detector 64 detects transducer radial location from head position data provided by the read/write channel 54, as the head position information in each servo sector 55 of the rotating disk 30 pass under the moving transducer 32. The detected head position information in each servo sector 55 provides the address of the track which contains the servo sector 55, and therefore, the location of the transducer 32 relative to that track. The timing circuit 56 is synchronized with the read/write channel 54, and the location detector 64 receives the head position data from the read/write channel 54.

The servo controller 56 further includes a microcontroller 66 for controlling movement and positioning of the transducer 32 including for seek operations. In response to clock signals from the timing circuit 62, wherein each clock signal indicates passage of a servo sector 55 under the transducer 32, the microcontroller 66 obtains said transducer location information from the location detector 64. The microcontroller 66 then utilizes the transducer location information in conjunction with the destination track data from the data controller 52, to generate said current value $I_{COMMAND}$ for moving and/or positioning the transducer 32. The current value $I_{COMMAND}$ from the microcontroller 66 is provided to a driver 68 on path 67, and the driver 68 supplies the input current $I_a$ to the actuator 29 on path 69 in proportion to the current value $I_{COMMAND}$, up to a maximum current supply capability of the driver 68. When the current $I_a$ is applied to the motor 36, the arm 34 moves radially inward or radially outward to perform a seek operation.

For moving the transducer, in one embodiment a feed current value FC is calculated by the microcontroller 66 to provide a base current value, depending upon the nature of the seek, such as the seek length. The feed current value FC is an a priori prediction of current expected to be required to carry out the seek. It is based on information which quantify the operating characteristics, some of which are developed during initialization calibration routines, and can be stored in memory. The feed current value FC allows more accurate adherence to a desired seek trajectory. Fundamentally, a nominal current waveform is preestablished for each seek length. The feed current value FC corresponds to the actuator current needed to keep the actuator on the idealized trajectory.

Figure 5:
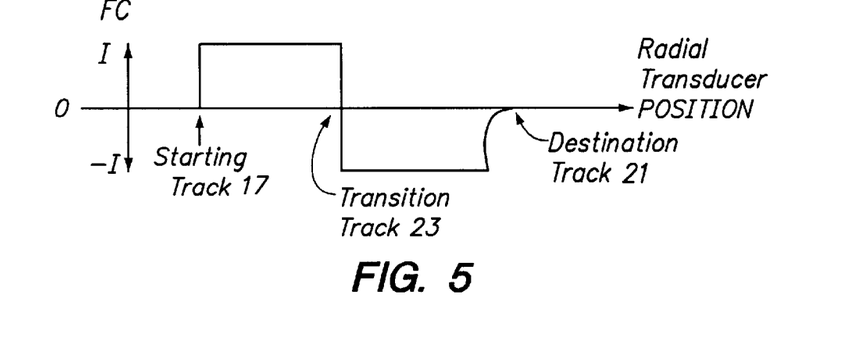
FIG. 5 is an example graph of a seek mode feed current waveform vs. transducer position, generated within the drive electronics of FIG. 3.
Figure 6A:
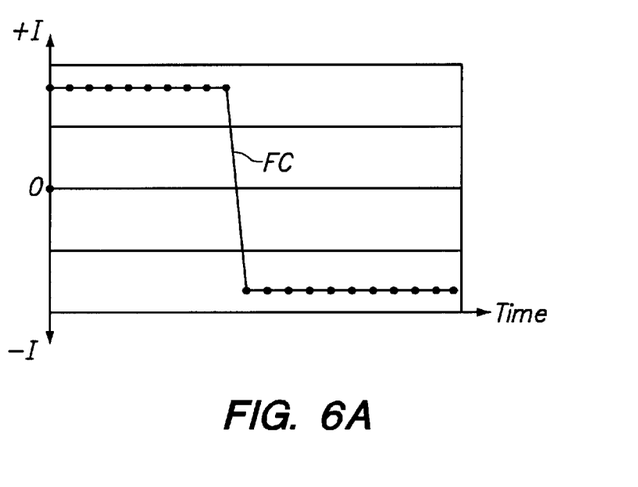
FIG. 6A is an example graph of seek mode feed current waveform vs. seek time in the vicinity of transition from acceleration to deceleration, generated within the drive electronics of FIG. 3.

An example of a feed current value FC waveform vs. track position for a seek length is shown in FIG. 5 and illustrates an initial positive full current increment for causing maximum acceleration away from a starting track 19 until the transducer 32 reaches a transition location such as a transition track 23 between the starting track 17 and the destination track 21, and then a negative full current increment for deceleration toward the destination track 21. FIG. 6A shows another example graph of the feed current FC waveform vs. time in the vicinity of transition track. The feed current value FC transitions suddenly from positive full current to negative full current over the transition track. According to one embodiment of the present invention, by predicting when this transition will occur and regulating the feed current value FC in preparation of this transition to generate the actuator current value $I_{COMMAND}$, the noise generated due to transition from acceleration to deceleration is substantially reduced.

In one implementation, the feed current value FC is decreased for decreasing the transducer acceleration in the vicinity of the transition location to achieve zero velocity as the transducer passes over the transition location. Subsequently, the feed current value FC is increased in the vicinity of the transition location for increasing the transducer deceleration from the transition location. For example, the feed current value FC can be gradually ramped down for gradually ramping down the transducer acceleration in the vicinity of the transition location to achieve zero velocity as the transducer passes over the transition location. Subsequently, the feed current value FC can be gradually ramped up in the vicinity of the transition location for gradually ramping up transducer deceleration from the transition location. As such, rapidly changing forces to the actuator during transition from acceleration to deceleration are reduced, resulting in reduced acoustic noise and vibration.

Figure 6B:
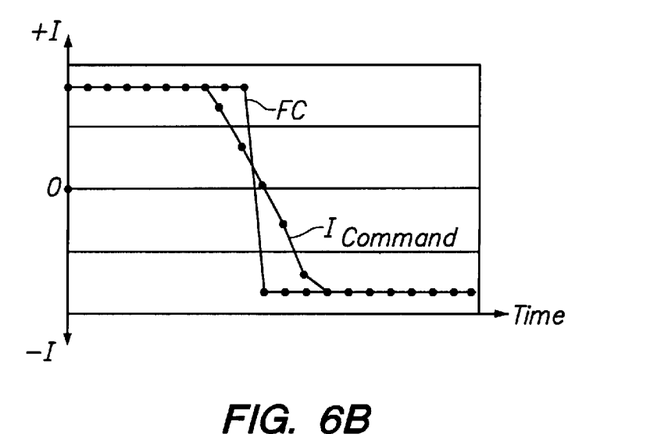
FIG. 6B is a graph showing the feed current waveform of FIG. 6A, and an actuator current $I_{COMMAND}$ generated by smoothing the feed current waveform in the vicinity of transition from acceleration to deceleration within the drive electronics of FIG. 3.

FIG. 6B is a graph showing the feed current value FC waveform of FIG. 6A, and the actuator current value $I_{COMMAND}$ generated by gradually ramping the feed current value FC in the vicinity of transition from acceleration to deceleration. Other modes of decreasing the feed current value FC as the transducer approaches the transition location for decreasing the transducer acceleration toward the transition location to achieve zero velocity as the transducer passes over the transition location, are also possible and contemplated by the present invention. Further, other modes of subsequently increasing the feed current value FC as the transducer moves away from the transition location for increasing, the transducer deceleration from the transition location, are also possible and contemplated by the present invention. As a result, rapidly changing forces to the actuator during transition from acceleration to deceleration are reduced, resulting in reduced acoustic noise and vibration.

Figure 7:
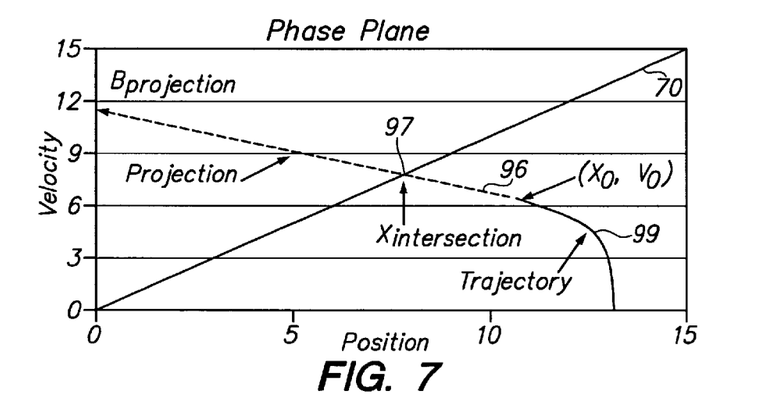
FIG. 7 shows an example graph of a switching curve for a seek length.

The decrease of the feed current value FC is a function of the radial distance between the transducer location and the transition track, and the rate of motion of the transducer across the disk tracks. Referring to FIG. 7, to determine the distance between a detected transducer location and the transition track (track-distance) a switching curve 70 in the velocity-position phase plane is utilized. In one example, the go switching curve 70 specifies the transition track for switching from acceleration to deceleration for the seek length to achieve a minimum seek time. The successive detected locations of the moving transducer in time and the corresponding track-distance information is utilized by the microcontroller 66 to generate the current value $I_{COMMAND}$ as described further below.

For simplicity, in FIG. 7 the switching curve 70 is represented as a sloped switching line. In general, a switching line corresponds to a range of seek lengths. To generate a switching line for a range of seek lengths, initially a first slope indicating a transition track is selected and a number of seeks over the seek length range are performed. The seek times for the different seek lengths are averaged and stored. The initial slope is changed and the process is then repeated. After multiple repetitions of the process corresponding to multiple slopes, the average seek times are compared, and a slope providing a minimum average seek time for the range of seek lengths is selected for the switching line corresponding to the seek length range.

For example, a first switching line may have a first slope for seek lengths of 500 tracks, and a second switching line may have a second slope for seek lengths of 1000. In general, the slope of the switching lines vary for different seek length ranges. The slopes of the switching lines decrease as the seek lengths increase, wherein the sharpest slope corresponds to the shortest seek length, and the shallowest slope corresponds to the longest seek length. The shortest seek length is one track, and the longest seek length is a full stroke. The switching lines are stored in e.g. local memory 71, and indexed by corresponding seek length ranges. To obtain a switching line for a seek length, the microcontroller 66 uses the seek length for the current seek operation, and addresses a switching line in memory corresponding to a seek length range in which the seek length falls.

Figure 8:
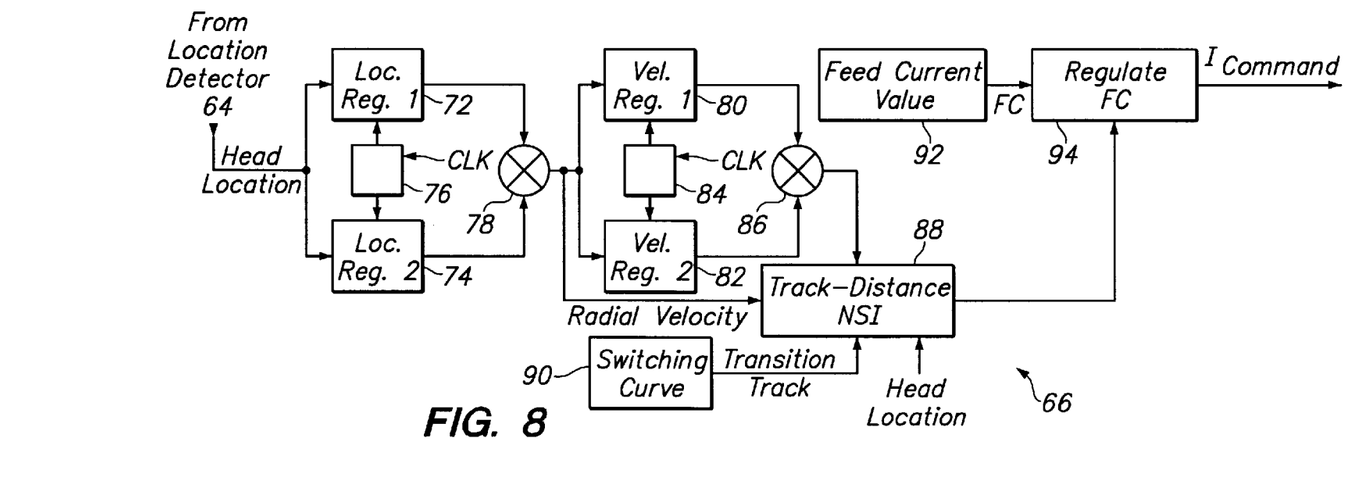
FIG. 8 shows an architectural model block diagram of the servo controller of FIG. 4 operating from transducer motion information in the track seeking operation.
Figure 9A:
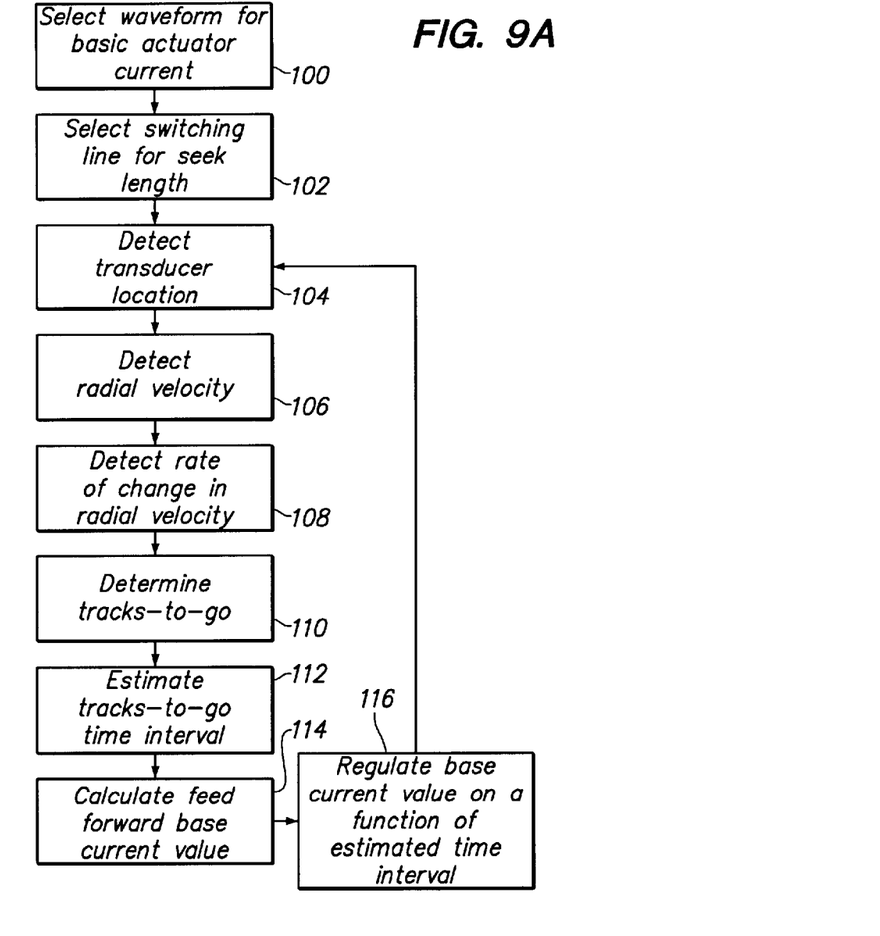
FIGS. 9A–9B show example flow diagrams of an embodiment of steps for performing seek operations according to the present invention.
Figure 9B:
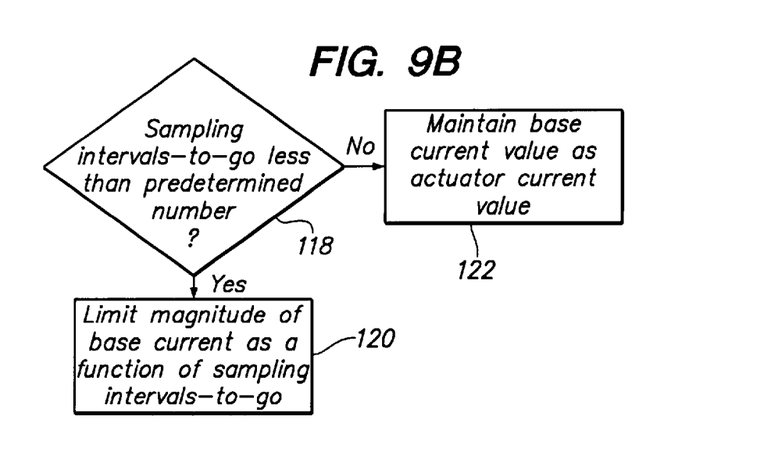

FIG. 8 depicts a model of the servo architecture of the microcontroller 66 as configured by process steps comprising the steps shown in the flow diagrams of FIGS. 9A–9B to perform seek operations according to the present invention. The a priori feed current values FC for the basic current corresponding to the seek length are calculated based on information retrieved from memory (step 100), and a switching line corresponding to the seek length is selected from memory (step 102). In on example, the feed current values FC are is stored in memory as a look-up table of entries, wherein each entry includes a current value FC, indexed by a distance between the transducer location and the destination track. The microcontroller 66 uses the distance between the transducer location and the destination track to obtain a corresponding FC value from the look-up table. In another example a feed current profile is predetermined and provides the amount of actuator current per distance from the destination track. A predetermined look-up table specifies the expected transducer velocity per distance from the destination track. As such, for each detected transducer location, the detected radial velocity is subtracted from the corresponding expected radial velocity. The difference is then used to adjust the profile current value for that detected transducer location to provide the feed current values FC. An example of such a process is described in the commonly assigned U.S. Pat. No. 5,005,089, titled "High performance, high capacity micro-Winchester disk drive", incorporated herein by reference.

Then in a closed loop, the microcontroller 66 repetitively performs the following steps during the acceleration and deceleration phases of the seek operation. In response to the clock signals CLK from the timing circuit 62, indicating passage of a servo sector 55 under the transducer 32, the microcontroller 66 obtains said transducer location information from the location detector 64 providing a detected transducer track location Xo (step 104). The microcontroller 66 then utilizes the transducer location Xo to determine the radial velocity Vo of the transducer 32 at the transducer location Xo (step 106). Further, the microcontroller 66 utilizes the radial velocity Vo of the transducer 32 to determine the rate of change Ao in the radial velocity of the transducer 32 at the transducer location Xo (step 108).

In one embodiment, in step 106 above, the microcontroller 66 calculates the radial velocity of the transducer 32 as the number of tracks crossed over by the transducer 32 in between two sampling intervals, where a sampling interval is defined by a servo sector 55 passing under the transducer 32. As such, during each sampling interval, the transducer location is detected, and the microcontroller 66 calculates the radial velocity of the transducer 32 by determining a difference in the number of tracks between: (1) a first transducer location detected during a present sampling interval, and (2) a second transducer location detected during a preceding sampling interval. Referring to FIG. 8, in an example implementation, successive transducer location values are alternately latched in first and second location registers 72, 74 by latching signals from a flip-flop control 76 in response to clock signals CLK from the timing circuit 62.

As such, in one scenario, the second transducer location detected during said preceding sampling interval is stored in the second location register 74, and the first transducer location detected during the present sampling interval is stored in the first location register 72. The track difference between the two transducer locations in registers 72, 74 is determined in a difference junction 78. The output of the junction 78 is the number of tracks crossed over by the transducer 32 between the two sampling intervals, providing a measure of the radial velocity of the transducer 32. The radial velocity can be expressed as tracks crossed over per sampling interval (i.e. tracks/sample). For example, if the transducer 32 crosses over one hundred tracks between two servo sectors, then the radial velocity of the transducer 32 is one hundred tracks per sampling interval, or one hundred tracks/sample.

In one embodiment, in step 108 above, the microcontroller 66 calculates the rate of change in radial velocity of the transducer as the difference between: (1) a first radial velocity of the transducer at a present sampling interval, and (2) a second radial velocity of the transducer at a preceding sampling interval. Referring to FIG. 8, in said example implementation, successive radial velocity values, corresponding to successive transducer locations, are alternately latched in first and second velocity registers 80, 82 by latching signals from a flip-flop control 84 in response to clock signals CLK from the timing circuit 62. As such, in one scenario, the second radial velocity value detected during said preceding sampling interval is stored in the second velocity register 82, and the first radial velocity value detected during the present sampling interval is stored in the first velocity register 80. The difference between the first and the second radial velocities is determined in a difference junction 86. The output of the junction 86 is the difference in radial velocity of the transducer 32 between the two sampling intervals, providing the rate of change in the radial velocity of the transducer 32.

The rate of change of radial velocity can also be estimated using a second degree observer. The observer utilizes the radial velocity and actuator current values as inputs and predicts the rate of change of velocity at the next sampling interval. The velocity information for each sampling interval is utilized by the observer in conjunction with a corresponding actuator current values in a closed loop to predict transducer acceleration at the next sampling interval. Basically, at each servo sector under the transducer, the present transducer motion related information, and actuator current values are used to predict the transducer acceleration at the next servo sector to pass under the transducer. The rate of change of transducer velocity is computed using backwards differences in radial velocity.

With reference to FIGS. 8 and 9A, in a process 88 the microcontroller 66 then utilizes a detected transducer location, and corresponding radial velocity and rate of change of radial velocity, in conjunction with the switching line 70 to determine the track-distance to the transition track (step 110). The microcontroller 66 also estimates a time interval in a process 88 for the transducer 32 to cross over the tracks in the track-distance based on the radial velocity and the rate of change of radial velocity of the transducer at the transducer location (step 112). In a process 92 the microcontroller 66 calculates the feed current value FC as the base actuator current for the transducer location as described above (step 114). If the transducer location Xo and radial velocity Vo pair is below the switching curve 70 in the phase plane (as shown in FIG. 7), the feed current values FC cause the actuator to accelerate the transducer 32. And, if said pair is above the switching curve, the feed current values FC cause the transducer to decelerate the transducer 32. The microcontroller 66 then regulates the feed current value FC as a function of the estimated time interval in a process 94 (step 116). Although in FIG. 8 the microcontroller 66 is shown to calculate feed current values FC in process 92, the calculation can be performed by another process in the servo controller 56, and the feed current values FC provided to the microcontroller 66 for use in process 94.

In a discrete time system, velocity can be expressed in units of change in distance per sample. Therefore, as detailed above, in the servo controller 56, radial velocity of the transducer 32 can be represented in tracks crossed over by the transducer 32 between two servo sector sampling interval, and said estimated time interval can be represented as a measure of the number of sampling intervals NSI for the transducer to cross over the track-distance based on the radial velocity and the rate of change of the radial velocity of the transducer in process 88 (step 112).

As such, regulating the feed current value FC in process 94 (step 116) can include the steps of limiting the magnitude of the feed current value FC as a function of the number of sampling NSI. In example implementation, in process 88 (step 112) above, the microcontroller 66 calculates the number of sampling NSI utilizing the switching line 70 for the seek length. With reference to FIG. 7, after detecting transducer track location Xo and the corresponding radial velocity Vo, and rate of change of velocity Ao, the microcontroller 66 estimates the track-distance between the transducer location Xo and the transition track, by steps equivalent to projecting a trajectory line 96 from a present position (Xo,Vo) in the phase plane with the same slope as the present trajectory 99 onto the switching line 70. The peak of the trajectory is at the crossing of the phase plane switching curve, where transducer acceleration is zero, and subsequently velocity is reduced by deceleration. As such the peak of the trajectory is defined by the switching curve 70.

For example, the switching line 70 can be represented by Relation 1:

$$V_{SWITCH}(X) = (M_{SWITCH} * X) \qquad \text{Relation 1}$$

Where, X is the transducer track location, V is radial velocity of the transducer 32, and $M_{SWITCH}$ is the slope of the switching line 70 for the seek length. The transition location is a linear function of the radial velocity and location of the transducer, $M_{SWITCH}$ is the linear constant that governs that relationship. The trajectory line 96 projected from the position (Xo, Vo) in the phase plane onto the switching line 70 intersects the switching line at an intersection 97. The trajectory line 96 can be represented by Relation 2:

$$V_{PROJECTION}(X) = (M_{PROJECTION} * X_{INTERSECT} + B_{PROJECTION}) \qquad \text{Relation 2}$$

Where, $X_{INTERSECT}$ is the position of intersection 97 in the phase plane, $V_{PROJECTION}$ is the projected radial velocity of the transducer 32 at the intersection 97, $B_{PROJECTION}$ is the intersection of the trajectory line 96 with the velocity axis, and $M_{PROJECTION}$ is the slope of the trajectory line 96 at (Xo, Vo). The values $B_{PROJECTION}$ and $M_{PROJECTION}$ can be determined by Relations 3 and 4, respectively:

$$B_{PROJECTION}=(Vo-M_{PROJECTION}*Xo) \quad \text{Relation 3}$$

$$M_{PROJECTION}=(-Ao/Vo) \quad \text{Relation 4}$$

To determine the values ($X_{INTERSECTION}$, $V_{INTERSECTION}$) for said intersection 97, the value $V_{SWITCH}$ is set equal to $V_{PROJECTION}$ using Relations 1 and 2, and solved for $X_{INTERSECTION}$ to yield Relation 5:

$$X_{INTERSECTION}=B_{PROJECTION}/(M_{SWITCH}-M_{PROJECTION}) \quad \text{Relation 5}$$

Then the track-distance value can be determined by Relation 6 as the distance between the transducer track location Xo and the transition track location $X_{INTERSECTION}$ at the intersection 97:

$$\text{distance to the intersection}=(Xo-X_{INTERSECTION}) \quad \text{Relation 6}$$

Where $Xo-X_{INTERSECTION}=(XO*M_{SWITCH}-Vo)/(M_{SWITCH}-M_{PROJECTION})$

The number of sampling intervals NSI for the transducer 32 to cross over the tracks between the present transducer track location Xo and the transition track location $X_{INTERSECTION}$ at the intersection 97 is determined by steps including dividing said distance to the intersection 97 by the present radial velocity of the transducer. The radial velocity of the transducer can be expressed in number of tracks crossed over by the transducer between two sampling intervals (i.e. tracks per sample). Further, the number of sampling intervals NSI can be represented as the number of samples to the intersection 97, according to Relation 7:

$$NSI-(Xo*M_{SWITCH}-Vo)/(Vo*M_{SWITCH}+Ao) \quad \text{Relation 7}$$

In one embodiment, in response to successive clock signals CLK from the timing circuit 62, the microcontroller 66 successively computes the number of sampling intervals NSI in the process 88, and decreases (e.g. ramps down) the feed current value FC as a function of the number of sampling intervals NSI during acceleration as the transducer approaches the transition track in process 94 (step 116). In a similar fashion, the microcontroller 66 subsequently increases (e.g. ramps up) the feed current value FC as a function of the number of sampling intervals NSI during deceleration as the transducer passes the transition track toward the destination track in process 94. The ramping effectively "smooths" the feed current value waveform FC across the transition track to generate the waveform $I_{COM-MAND}$ in the vicinity of the transition track during the seek time as shown in FIG. 6B.

Referring to FIG. 9B, in one embodiment, the process 94 (step 116), can further include the steps of comparing the number of sampling intervals NSI a preselected number (step 118). If the number of sampling intervals NSI is less than the preselected number, then the microcontroller 66 regulates the feed current value FC to generate the current value $I_{COMMAND}$ by e.g. limiting the magnitude of the feed current value FC as a function of the number of sampling intervals NSI for ramping down and then ramping up the feed current value FC as described above (step 120). Otherwise, if the number of sampling intervals NSI is greater than or equal to the preselected number, then the microcontroller 66 can use the feed current value FC as the current value $I_{COMMAND}$ to maintain the acceleration and/or deceleration of the transducer at a predetermined value (step 122). As such, the microcontroller 66 regulates the feed current value FC during acceleration and/or deceleration only in the vicinity of the transition track by ramping the feed current value FC as described. The span of said vicinity around the transition track, in time and in number of tracks, is proportional to said predetermined number.

An example process for ramping of the feed current value FC by the microcontroller 66 is described below, wherein the microcontroller 66 limits the magnitude of the feed current value FC in the vicinity of the transition track. The process can be utilized during acceleration and/or deceleration of the transducer 32. During acceleration, the feed current value FC is ramped down in the vicinity of the transition track based on the number of forward sampling intervals NSI between the transducer location track and the transition track. Similarly, during deceleration, the feed current value FC is ramped up in the vicinity of the transition track based on the number of backward sampling intervals NSI the transducer required to cross over the tracks between the transition track and the transducer location track.

Specifically for each detected transducer location, the microcontroller 66 first calculates the number of sampling intervals NSI required by the transducer 32 to cross over the track-distance between the transition track and the transducer location track based on the radial velocity and rate of change of radial velocity of the transducer 32. Relation 8 below is equivalent to Relation 7 above for calculating the number of sampling intervals NSI:

$$NSI=|(\text{distance to intersection})/Vo|; \quad \text{Relation 8}$$

The number of sampling intervals NSI is then compared to a predetermined number N (e.g., 3). If the number of sampling intervals NSI is greater than the predetermined number N, the microcontroller 66 calculates an actuator current value P_Max and stores the value P_Max into a register Max_Current. For example, the value P_Max can be the a priori feed current value FC corresponding to the presently detected transducer location. If however, the number of sampling intervals NSI is less than or equal to the predetermined number N, then the microcontroller 66 ramps the P_Max value by calculating a magnitude limit value (NSI/N) as a function of the number of sampling intervals NSI, and stores the ramped current value (P_Max*NSI/N) into the register Max_Current. An example pseudo-logic implementing the above process for includes the following steps which are repeated for each clocking signal CLK:

---

Detect Xo;
Detect Vo;
Detect Ao;
NSI = (Xo*M$_{SWITCH}$ − Vo)/(Vo*M$_{SWITCH}$ + Ao);
if (NSI > N)
{
    Max_Current = P_Max;
}
Else / determine ramp down or ramp up actuator current value /
{
    Max_Current = P_Max * NSI/N;
}
If (I$_{COMMAND}$ > Max_Current)
{
    I$_{COMMAND}$ = Max_Current
}
Else If (I$_{COMMAND}$ <- Max_Current)
{
    I$_{COMMAND}$ = − Max_Current
}

---

The magnitude limit value (NSI/N) represents a control signal for ramping the actuator current P_MAX using the product (P_Max*NSI/N) when the value NSI is greater than or equal to N, for generating the current values $I_{COMMAND}$. The driver 68 then generates the actuator current $I_a$ in proportion to the current values $I_{COMMAND}$. The number of samples NSI is not limited to integer values and can include a fractional component. Further, the predetermined value N can be selected to pattern the slope of the ramping up and/or ramping down. In the above implementation, the larger the value of N, the more gradual ramp down is during acceleration, the more gradual ramp up is during deceleration. As such, a larger value for the number N further reduces noise and vibration. However, a larger value for the number N also increases the computation time, and increases the seek time by: (1) initiating reduction in the transducer acceleration at a greater transducer distance to the transition track, and (2) delaying maximum transducer deceleration at a greater transducer distance past the transition track. As such, the number N can be selected based on the disk drive characteristics and desired performance requirements.

In addition to the example product (P_Max*NSI/N), other relationships for increasing/decreasing the actuator current. P_MAX near the transition location as a function of the transducer distance to the transition track and the rate of motion of the transducer, are also possible and contemplated by the present invention. Further, other magnitude limits for increasing and/or decreasing the actuator current near the transition location, as described above, are also possible and contemplated by the present invention. As a result, rapidly changing forces to the actuator during transition from acceleration to deceleration are reduced, resulting in reduced acoustic noise and vibration.

In the above description, the track-distance (e.g. tracks-to-go) and the number of sampling intervals NSI apply to both acceleration and deceleration phases of the seek operation. During acceleration when the transducer 32 is approaching the transition track, the track-distance is the forward distance from the transducer location to the transition track detected at each clock signal CLK or sampling interval. During deceleration, when the transducer 32 is moving away from the transition track, the track-distance is the backward distance from the transducer location to the transition track detected at each clock signal CLK or sampling interval. As such, the steps for ramping down the actuator current to ramp down transducer acceleration before the transition track can be used for ramping up the actuator current to ramp up transducer deceleration past the transition track. Therefore, in the above steps, such as in Relation 8, the absolute value of ((distance to intersection)/Vo) is utilized so that the same process can be used for acceleration as the transducer approaches the transition track, and for deceleration as the transducer moves away from the transition track. Alternatively, the values $I_{COMMAND}$ for ramping down during acceleration can be stored, and used with different polarity in the proper sequence for ramping up during deceleration.

The servo controller 56 can comprise a logic circuit configured by program instructions implementing the steps performed by servo controller 56 as detailed above. The logic circuit can be implemented as an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in the chip rather than using an instruction set requiring multiple clock cycles to execute. An ASIC is typically fabricated using CMOS technology with custom, standard cell physical placement of logic (PPL) gate array, or field programmable gate array (FPGA) design methods. Alternatively, the servo controller 56 can comprise a microprocessor interconnected to a memory storing said program instructions for execution by the microprocessor. Similarly, the microcontroller 66 can comprise a logic circuit such as ASIC configured by program instructions implementing the steps performed by the microcontroller 66 as detailed above. Alternatively, the microcontroller 66 can comprise a microprocessor interconnected to a memory storing said program instructions for execution by the microprocessor.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for radially moving a transducer over a storage surface of a rotating data disk including multiple concentric data tracks, for reducing noise generated during a seek operation from a starting track to a destination track on the disk, the transducer being radially moveable relative to said data tracks by an actuator in proportion to an input signal to the actuator, wherein the transducer is initially accelerated away from the starting track to a radial transition location between the starting track and the destination track, and then decelerated toward the destination track from the transition location, comprising the steps of:

(a) detecting a radial location of the transducer in relation to the disk tracks;

(b) detecting the distance between the transducer location and the transition location;

(c) estimating a time interval for the transducer to traverse the detected distance; and (d) regulating the input signal as a function of the estimated time interval to control the rate of change of the radial velocity of the transducer across the disk.

2. The method of claim 1 further comprising the steps of: repetitively performing steps (a) through (c), and for each estimated time interval, performing steps including step (d).

3. The method of claim 2, wherein the step of regulating the input signal further includes the steps of limiting the magnitude of the input signal as a function of the estimated time interval.

4. The method of claim 2, wherein the step of estimating the time interval includes the steps of:

detecting the radial velocity of the transducer across the disk at the detected radial location of the transducer;

detecting the rate of change of the radial velocity of the transducer at the detected radial location of the transducer; and estimating the time interval as a function of: (1) the detected distance, (2) the detected radial velocity, and (3) the detected rate of change of the radial velocity.

5. The method of claim 2, wherein the concentric data tracks are periodically interrupted by a plurality of embedded radial servo sectors per rotation, each servo sector recorded with head position information and defining a sampling interval, and wherein:

step (a) further includes the steps of detecting the radial location of the transducer by detecting the head position information in a servo sector passing under the transducer; and step (d) further includes the steps of:

(1) estimating a number of sampling intervals in the estimated time interval;

(2) comparing the estimated number of sampling intervals to a preselected number; and (3) if the estimated number of sampling intervals is less than the preselected number, then regulating the input signal as a function of the estimated number of sampling intervals to control the rate of change of radial velocity of the transducer across the disk.

6. The method of claim 5, wherein step (d)(3) further includes the steps of:

if the estimated number of sampling intervals is greater than or equal to the preselected number, then regulating the input signal to maintain the rate of change in radial velocity of the transducer at a predetermined level.

7. The method of claim 2, wherein during said acceleration of the transducer:

step (b) further includes the steps of detecting the forward distance between the transducer location and the transition location as said detected distance; and step (d) further includes the steps of reducing the input signal as a function of the estimated time interval to reduce the transducer acceleration toward the transition location for achieving zero transducer acceleration as the transducer passes over at the transition location.

8. The method of claim 2, wherein during said deceleration of the transducer:

step (b) further includes the steps of detecting the backward distance between the transducer location and the transition location as said detected distance; and step (d) further includes the steps of increasing the input signal as a function of the estimated time interval to increase the transducer deceleration from the transition location.

9. The method of claim 2 further comprising the steps of repetitively performing steps (a) through (d) during said acceleration and said deceleration of the transducer.

10. The method of claim 1, wherein the transition location is selected to reduce a seek time for performing the seek operation.

11. A method for radially moving a transducer over a storage surface of a rotating data disk including multiple concentric data tracks, for performing a seek operation from a starting track to a destination track on the disk, the transducer being radially moveable relative to said data tracks by an actuator in proportion to an input signal to the actuator, wherein the transducer is initially accelerated away from the starting track to a radial transition location between the starting track and the destination track, and then decelerated toward the destination track from the transition location, comprising the steps of:

(a) detecting a radial location of the transducer in relation to the disk tracks;

(b) detecting the distance between the radial location of the transducer and the transition location;

(c) detecting the radial velocity of the transducer across the disk at the radial location of the transducer;

(d) detecting the rate of change of the radial velocity of the transducer across the disk at the radial location of the transducer; and (e) regulating the input signal as a function of: (1) the detected distance, (2) the detected radial velocity, and (3) the detected rate of change of the radial velocity, to control the rate of change of the radial velocity of the transducer.

12. The method of claim 11 further comprising the steps of: repetitively performing steps (a) through (d), and for each set of a detected distance, a detected radial velocity, and a detected rate of change of radial velocity, performing steps including step (e).

13. The method of claim 12, wherein the step of regulating the input signal includes the steps of limiting the magnitude of the input signal as a function of: (1) the detected distance, (2) the detected radial velocity, and (3) the detected rate of change of the radial velocity, to control the rate of change of the radial velocity of the transducer.

14. The method of claim 12, wherein the concentric data tracks are periodically interrupted by a plurality of embedded radial servo sectors per rotation, each servo sector recorded with head position information and defining a sampling interval, and wherein:

step (a) further includes the steps of detecting a radial location of the transducer by detecting the head position information in a servo sector passing under the transducer; and step (e) further includes the steps of:

(1) estimating a number of sampling intervals passing under the transducer over the detected distance, as a function of the detected distance, radial velocity, and rate of change of radial velocity;

(2) comparing the estimated number of sampling intervals to a preselected number; and (3) if the estimated number of sampling intervals is less than the preselected number, then regulating the input signal as a function of the estimated number of sampling intervals to control the rate of change of radial velocity of the transducer across the disk.

15. The method of claim 14, wherein step (d)(3) further includes the steps of:

if the estimated number of sampling intervals is greater than or equal to the preselected number, then regulating the input signal to maintain the rate of change in radial velocity of the transducer at a predetermined level.

16. The method of claim 12, wherein during said acceleration of the transducer:

step (b) further includes the steps of detecting the forward distance between the transducer location and the transition location as said detected distance; and step (e) further includes the steps of reducing the input signal according to said function to reduce the transducer acceleration toward the transition location for achieving essentially zero transducer acceleration as the transducer passes over the transition location.

17. The method of claim 12, wherein during said deceleration of the transducer:

step (b) further includes the steps of detecting the backward distance between the transducer location and the transition location as said detected distance; and step (e) further includes the steps of increasing the input signal according to said function to increase the transducer deceleration from the transition location.

18. The method of claim 11, wherein the transition location is selected to reduce a seek time for performing the seek operation.

19. A servo controller for controlling seek operations in a disk drive including a spindle motor for rotating at least one data disk and an actuator structure for radial movement of a transducer over a storage surface of the data disk including multiple concentric data tracks, wherein for each seek operation the actuator structure radially moves the transducer from a starting track to a destination track on the disk in proportion to an input signal, such that the transducer is initially accelerated away from the starting track to a radial transition location between the starting track and the destination track, and then decelerated toward the destination track from the transition location, the disk drive further including means for providing data identifying the transition location for the seek operation, the servo controller comprising:

a location detector for detecting successive radial locations of the transducer relative to the disk tracks in response to successive clocking signals during the seek operation; and a programmed digital controller connected to said means for providing data identifying the transition location and to said location detector, the programmed digital controller being configured by program instructions for performing the steps of:

for each detected transducer radial location:
(a) determining the distance between the detected radial location of the transducer and the transition location;
(b) determining the radial velocity of the transducer across the disk at the detected radial location of the transducer;
(c) determining the rate of change of the radial velocity of the transducer across the disk at the detected radial location of the transducer; and
(d) generating a control signal for regulating the input signal as a function of: (1) the detected distance, (2) the detected radial velocity, and (3) the detected rate of change of the radial velocity, to control the rate of change of the radial velocity of the transducer.

20. The servo controller of claim 19, wherein the programmed digital controller is further responsive to said clocking signals, and is further configured by program instructions such that in response to each successive clocking signal the programmed digital controller obtains the detected radial location of the transducer from the location detector and performs the steps (a)–(d).

21. The servo controller of claim 19, wherein the programmed digital controller generates the control signal to regulate the input signal by limiting the magnitude of the input signal as a function of: (1) the detected distance, (2) the detected radial velocity, and (3) the detected rate of change of the radial velocity, to control the rate of change of the radial velocity of the transducer.

22. The servo controller of claim 19, wherein during said acceleration of the transducer the programmed digital controller detects the forward distance between the detected transducer radial location and the transition location as said detected distance, and generates the control signal to reduce the input signal according to said function to reduce the transducer acceleration toward the transition location for achieving zero transducer acceleration as the transducer passes over the transition location.

23. The servo controller of claim 19, wherein during said deceleration of the transducer the programmed digital controller detects the backward distance between the detected transducer radial location and the transition location as said detected distance, and generates the control signal to increase the input signal according to said function to increase the transducer deceleration from the transition location.

24. The servo controller of claim 19, wherein the transition location is selected to reduce a seek time for performing the seek operation.

25. The servo controller of claim 19, wherein the concentric data tracks are periodically interrupted by a plurality of embedded radial servo sectors per rotation, each servo sector recorded with head position information and defining a sampling interval, and wherein:

the location detector detects the radial location of the transducer by detecting the head position information in a servo sector passing under the transducer; and the programmed digital controller is further configured by program instructions to perform the steps of:
estimating a number of sampling intervals passing under the transducer over the detected distance, as a function of the detected distance, radial velocity, and rate of change of radial velocity;
comparing the estimated number of sampling intervals to a preselected number; and
if the estimated number of sampling intervals is less than the is preselected number, then generating the control signal to regulate the input signal as a function of the estimated number of sampling intervals to control the rate of change of radial velocity of the transducer across the disk.

26. The servo controller claim 25, wherein the programmed digital controller is further configured by program instructions to perform the steps of:

if the estimated number of sampling intervals is greater than or equal to the preselected number, then generating the control signal to regulate the input signal to maintain the rate of change in radial velocity of the transducer at a predetermined level.

27. A servo controller for controlling seek operations in a disk drive including a spindle motor for rotating at least one data disk and an actuator structure for radial movement of a transducer over a storage surface of the data disk including multiple concentric data tracks, wherein for each seek operation the actuator structure radially moves the transducer from a starting track to a destination track on the disk in proportion to an input signal, such that the transducer is initially accelerated away from the starting track to a radial transition location between the starting track and the destination track, and then decelerated toward the destination track from the transition location, the disk drive further including means for providing data identifying the transitions location for the seek operation, the servo controller comprising:

a location detector for detecting successive radial locations of the transducer in relation to the disk tracks in response to successive clocking signals;

a distance detector responsive to said means for providing data identifying the transition location for the seek operation and to the location detector, such that for each detected transducer radial location the distance detector detects the distance between the detected transducer radial location and the transition location;

a velocity detector responsive to the location detector and the clocking signals, for detecting a radial velocity of the transducer across the disk at each detected transducer radial location;

a velocity rate detector responsive to the velocity detector and the clocking signals, for detecting a rate of change of the radial velocity of the transducer across the disk at each radial location of the transducer; and controller means responsive to the distance detector, the velocity detector and the velocity rate detector, such that for each set of a detected distance, a detected radial velocity and a detected rate of change of radial velocity, the controller means generates a control signal for regulating the input signal as a function of: (1) the detected distance, (2) the detected radial velocity, and (3) the detected rate of change of the radial velocity, to control the rate of change of the radial velocity of the transducer.

28. The servo controller of claim 27, wherein the controller means is responsive to said clocking signals, wherein in response to each clocking signal the controller means generates the control signal for regulating the input signal as a function of: (1) the detected distance, (2) the detected radial velocity, and (3) the detected rate of change of the radial velocity, to control the rate of change of the radial velocity of the transducer.

29. The servo controller of claim 27, wherein controller means generates the control signal to limit the magnitude of the input signal as a function of: (1) the detected distance, (2) the detected radial velocity, and (3) the detected rate of change of the radial velocity, to control the rate of change of the radial velocity of the transducer.

30. The servo controller of claim 27, wherein during said acceleration of the transducer:

the distance detector detects the forward distance between the transducer location and the transition location as said detected distance; and the controller means generates the control signal for reducing the input signal according to said function to reduce the transducer acceleration toward the transition location for achieving zero transducer acceleration as the transducer passes over the transition location.

31. The servo controller of claim 27, wherein during said deceleration of the transducer:

the distance detector detects the backward distance between the transducer location and the transition location as said detected distance; and the controller means generates the control signal for increasing the input signal according to said function to increase the transducer deceleration from the transition location.

32. The servo controller of claim 27, wherein the transition location is selected to reduce a seek time for performing the seek operation.

33. The servo controller of claim 27, wherein the concentric data tracks are periodically interrupted by a plurality of embedded radial servo sectors per rotation, each servo sector recorded with head position information and defining a sampling interval, and wherein:

the location detector detects the radial location of the transducer by detecting the head position information in a servo sector passing under the transducer; and the controller means further includes:

means for estimating a number of sampling intervals passing under the transducer over the detected distance, as a function of each set of a detected distance, a detected radial velocity, and a detected rate of change of radial velocity;

means for comparing the estimated number of sampling intervals to a preselected number; and signal generator means, such that if the estimated number of sampling intervals is less than the preselected number, then the signal generator generates the control signal for regulating the input signal as a function of the estimated number of sampling intervals to control the rate of change of radial velocity of the transducer across the disk.

34. The servo controller of claim 33, wherein if the estimated number of sampling intervals is greater than or equal to the preselected number, then the signal generator generates the control signal for regulating the input signal to maintain the rate of change in radial velocity of the transducer at a predetermined level.

* * * * *